United States Patent [19]

Matsui et al.

[11] Patent Number: 4,771,931
[45] Date of Patent: Sep. 20, 1988

[54] CONTINUOUS PRODUCTION OF SEAM-WELDED METAL TUBING

[75] Inventors: Shigetomo Matsui, Osaka; Hiroyuki Matsumura, Kobe; Hisahiko Miyazaki, Osaka; Munekatsu Furugen, Nishinomiya, all of Japan

[73] Assignees: Sumitomo Metal Industries Ltd.; Kawasaki Jukogyo Kabushiki Kaisha, both of Osaka, Japan

[21] Appl. No.: 60,083

[22] Filed: Jun. 9, 1987

[30] Foreign Application Priority Data

Jun. 11, 1986 [JP] Japan .................. 61-137094

[51] Int. Cl.⁴ .............................................. B23K 31/06
[52] U.S. Cl. ...................................... 228/147; 228/144
[58] Field of Search ............... 228/146, 147, 144, 129, 228/130, 173 F; 72/368, 52; 29/148, DIG. 21, DIG. 24

[56] References Cited

U.S. PATENT DOCUMENTS

| 1,960,523 | 5/1934 | Anderson | 228/147 |
|---|---|---|---|
| 2,666,831 | 1/1954 | Seulen et al. | |
| 2,673,274 | 3/1954 | Vaughan et al. | |
| 2,977,914 | 4/1961 | Gray et al. | 228/147 |
| 3,127,674 | 4/1964 | Kohler | 228/147 |
| 4,460,118 | 7/1984 | Ataka | 228/146 |

FOREIGN PATENT DOCUMENTS

| 0158979 | 10/1985 | European Pat. Off. | 228/144 |
|---|---|---|---|
| 43-14092 | 2/1968 | Japan | 228/147 |
| 1292471 | 4/1969 | Japan | 228/147 |
| 0050715 | 5/1981 | Japan | 228/147 |
| 0102313 | 8/1981 | Japan | 228/147 |
| 58-184073 | 10/1983 | Japan . | |

Primary Examiner—Kurt Rowan
Attorney, Agent, or Firm—Wenderoth, Lind & Ponack

[57] ABSTRACT

A process of continuous production of seam-welded steel tubing is concerned.

A steel strip is taken out from a strip coil and conveyed to a tube-preshaping step including a plural of shaping roll stand positions. In the preshaping step, the strip is laterally rounded up gradually from band strip to a rough-shaped tubing until the side edges are brought into a mutually abutting state ready for seam-welding. The preshaping step is divided into a plurality of local regions. In these local regions, substantially body portion with exception of corresponding marginal edge zones of the tubing stock is separately subjected to heating. The heating width and heating intensity at these regions are increased stepwise as the tubular stock advances from upstream to downstream for avoiding conventionally appearing edge wavings and buckling undulations in the material of the steel tubing.

3 Claims, 3 Drawing Sheets

CONTINUOUS PRODUCTION OF SEAM-WELDED METAL TUBING

BACKGROUND OF THE INVENTION

This invention concerns improvements in a process for continuous production of seam-welded metal, preferably steel, tubings.

In the art of continuous manufacture of seam-welded steel pipes, a steel strip stock is taken out from a strip coil and subjected to a tube-shaping step and then finally to a seam-welding step.

In this case, longitudinal edge zones including strip edges are subjected to higher plastic, tensile deformations than the remaining body part of the tubing being formed. As a consequence at the finpass zone defining the terminal of the tube-shaping step, excess, residual compressive stresses are produced in said longitudinal edge zones, while in the substantial body portion of the tubing, excess, residual tensile stresses are produced, with resultant disadvantageous invitation of buckling undulations which disturb desired optimal edge-welding operation.

SUMMARY OF THE INVENTION

It is an object of the present invention to provide a seam-welded tubing manufacturing process capable of processing a strip or web, even if it has a thinner or thicker wall thickness, as the case may be.

A further object is to provide a process of the above kind, capable of suppressing disadvantageous formation of buckling undulations, not only in the first half shaping step, but also in the second half of the preshaping stage as a whole.

For the fulfilment of these objects, features and merits of the invention, a process for continuous manufacture of a seam-welded metal tubing is proposed, as comprising: a step for unwinding a metal strip from a strip coil; a preshaping step for rounding up of said metal strip into a tubular stock stepwise at successive and separated local roll stand positions; a seam-welding step for welding opposing and abutting longitudinal edges of said tubular stock and for providing a welded seam; and a heating step provided in advance of said seam-welding step for heating substantial portion of said preshaped tubular stock with exception of edge zones extending along said longitudinal edges, respectively, said heating step being divided into a plurality of local zones, heating width in the divided local zones being increased stepwise toward the seam-welding step.

For the tubular stock heating purpose, a gas burner, an electric resistance heater; an electric induction heater or the like conventional means may be employed.

In the following, referring to accompanying drawings, more detailed description of related prior art and of preferred embodiment will be made.

DETAILED DESCRIPTION OF THE INVENTION

Figure 2:
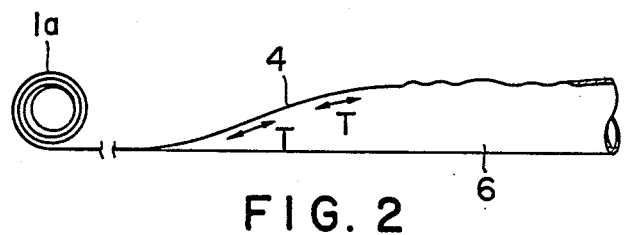
FIG. 2 is a schematic elevation of part of a steel strip which is being subjected preliminarily to a tubeshaping step.
Figure 3:
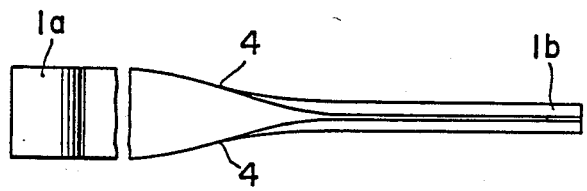
FIG. 3 is a top plan view thereof.

Before entering into detailed description of preferred embodiments of this invention, a related prior art plant as disclosed in Japanese Patent Laid-Open Publication, unexamined, Sho-58-184073, will be set forth with reference to FIGS. 1-3.

Figure 1:
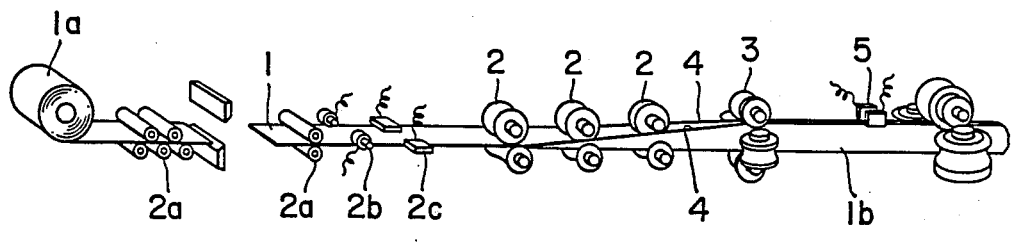
FIG. 1 is a perspective view of a plant for continuous production of seam-welded steel tubings, belonging to prior art and forming the starting point of the present invention process.

As is shown in FIG. 1, a steel strip 1 is previously wound in the form of a coil 1a.

Figure 5:
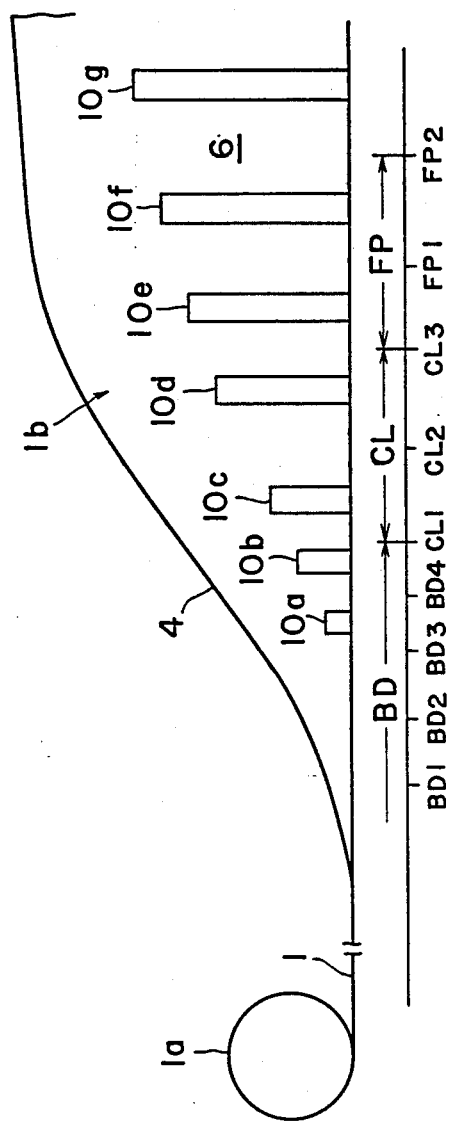
FIG. 5 is a schematic, enlarged elevation of part of the steel strip stock which is being subjected jointly to a tube-shaping step and a stepwise heating step including a plurality of stepwise heaters, each of which is arranged between two successive shaping roll stands.

The strip 1 is unwound from the coil 1a through a plurality of guide rollers 2a; edge guides 2b; 2c and further through shaping roller stands 2 and finpass roller group 3 for performing a strip-round up and strip edge butt-joining job in succession, so as to provide a continuous tubing stock 1b. The longitudinal edges are shown at 4; 4 in close upstream position of the finpass roller group 3. In practice, finpass roller group 3 may consist of two separated roll stands FP1 and FP2 as shown in FIG. 5. At a certain distance therefrom, there is provided a conventional welding means 5 for welding together the opposing and abutting side edges 4; 4 to provide a continuous seam-welded tubing.

As is commonly known, the material of the stock is subjected to higher plastic tensile stresses in the proximity of the longitudinal edges 4; 4 than those appearing in the remaining portions 6 during the tube-shaping step, and therefore, at the finpass zone, residual compressive stresses will be generated in the proximity of the edges 4; 4, while residual tensile stresses are generated in the remaining part of the tubular stock, thus giving rise to formation of buckling undulations so called among those skilled in the art in the proximity of these edges due to resulting buckling loads. It has been experienced that the seam-welding operation is considerably disturbed by the presence of such buckling undulations, if any.

In the conventional technique, the stock material at said other remaining areas 6 is subjected to a heat treatment, as disclosed in U.S. patent application Ser. No. 754,202, so as to introduce a corresponding thermal expansion thereinto during the processing step including the tube-shaping and seam-welding, for the purpose of releasing the excessive residual compressive stresses otherwise appearing in the edge regions and for suppressing the delicate and troublesome formation of edge buckling undulations.

It should be noted that when the generation of the aforementioned kind of buckling undulations is intended to suppress under utilization of specifically induced thermal stresses in the above-mentioned manner, the following troubles have been encountered. When the strip stock 1 of relatively large thickness is utilized, the bucklings are rather frequently observed at the downstream half of the tube-forming step. On the contrary, with use of a strip stock having very small thickness, deflections of considerable amount frequently occur during passage through successive two shaping roll stands, already in the upstream half of the tubing step, resulting rather frequently in inviting buckling distortions. These distortions will become rather apparent as the tube-shaping operation proceeds forward. By virtue of this fact, even if the substantial body portion 6 excepting marginal side edge zones is heated or conversely even if these edge zones per se are subjected to cooling, local out-of-face distortions may nevertheless remain, since such local areas as once subjected to buckling distortions were highly and plastically distorted to a considerable degree, regardless of a macroscopic countermeasure generally adopted and executed for prevention of occurrence of the bucklings.

In case of residual existence of such out-of-face distortions, the opposing edge surfaces are not brought into mutual registration, with resultant generation of welding defects such as pin wholes and pits. In order to realize a defectlessly welded seam, therefore, any formation of edge-wavings and/or buckling undulations must be positively prevented.

Figure 4:
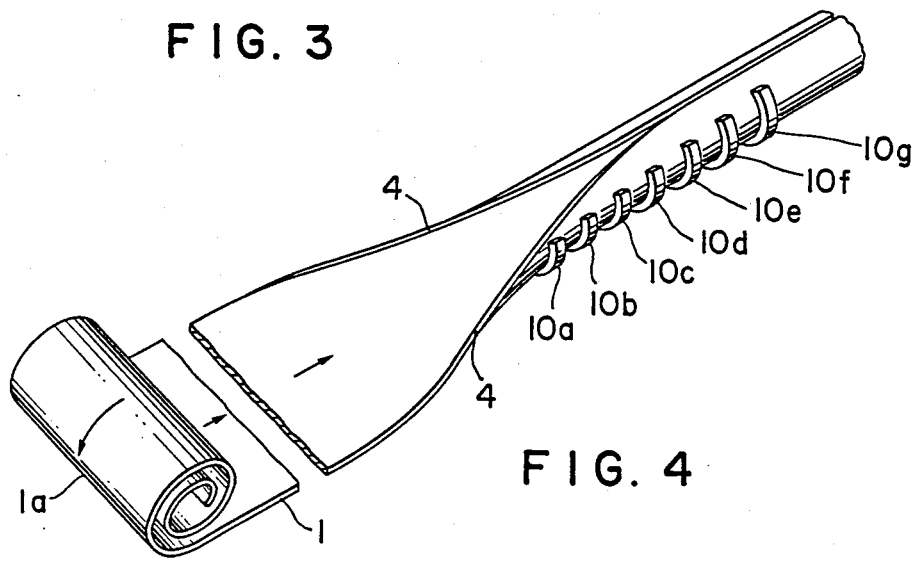
FIG. 4 is a perspective view illustrating an apparatus for carrying out the process according to this invention.
Figure 6:
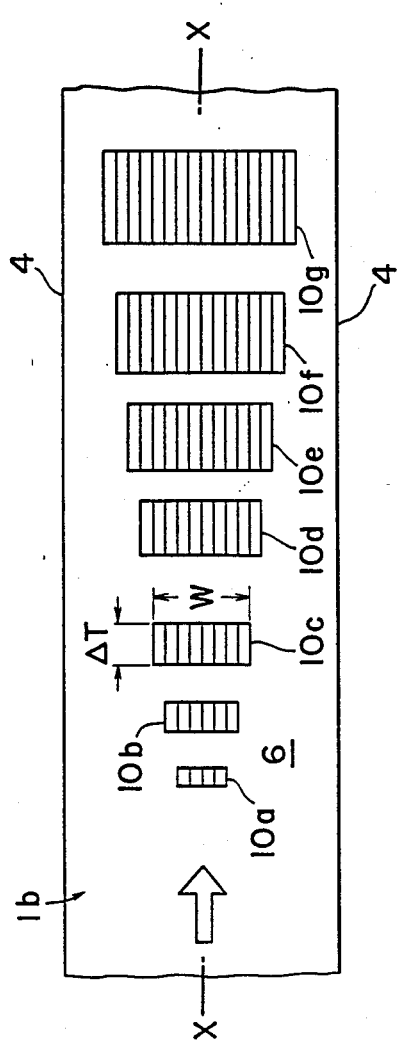
FIG. 6 is an enlarged schematic developed plan view of the strip stock partially rounded up in the shaping step.

The process of this invention can solve the problems stated above. Referring now to FIGS. 4 through 6, in the process for the manufacture of seam-welded steel tubings according to this invention, symbol BD represents a break-down zone; CL a cluster zone and FP a finpass zone, each containing several roll stands. More specifically, break-down zone BD comprises a first to fourth break-down roll stands BD1–BD4; cluster zone CL first to third cluster roll stands CL1–CL3; and finpass zone FP second finpass roll stands FP1 and FP2, respectively.

Figure 7:
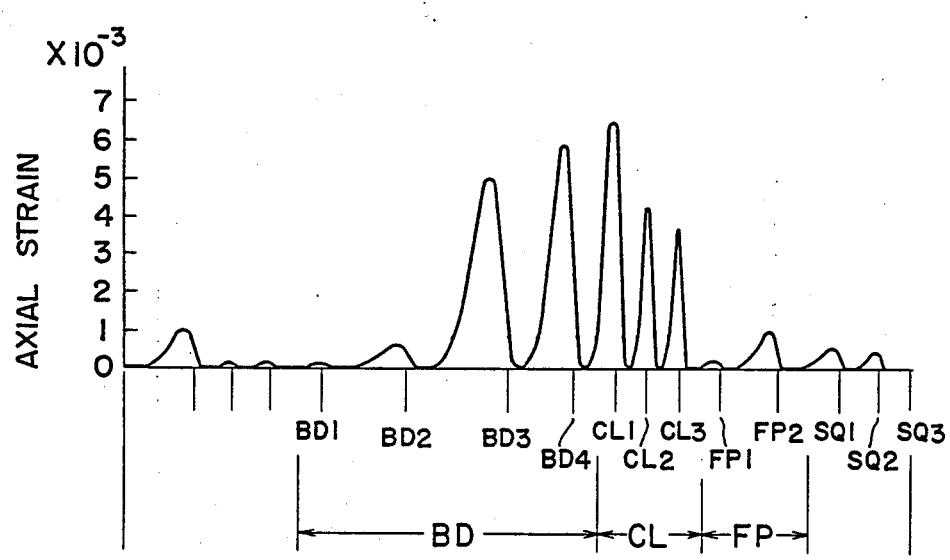
FIG. 7 is a diagram showing an example of distribution of axial strain as appearing in one of the longitudinal edge zones during the tube-preshaping step.
Figure 8:
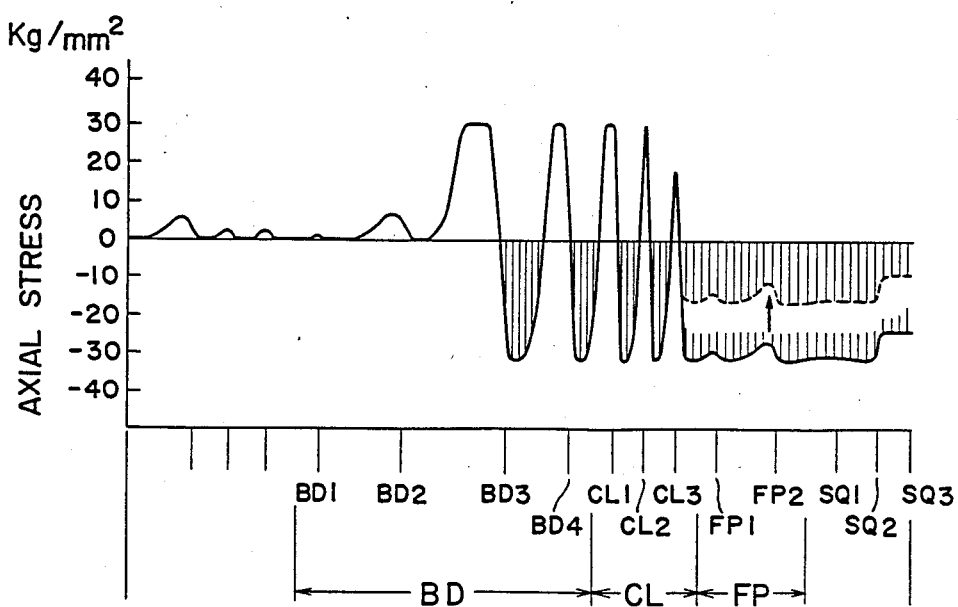
FIG. 8 is a further diagram showing an example of axial stress distribution as appearing in one of the longitudinal edge zones during the tube-preshaping step.

As shown in FIGS. 7 and 8, axial strains and axial compressive stresses in the longitudinal edge 4 of a strip which is undergoing the tube forming step are especially high at and after the third break-down roll stand BD3 when seen in the stock forwarding direction. According to this invention, heating units 10a; 10b; ... 10g are provided successively in the inter-rollstand regions after the third break-down roll stand BD3 as shown in FIGS. 4 and 5, so as to compensate said axial compressive stresses. In this case, as is shown schematically in FIG. 6, a substantial portion 6 of the strip 1b being rounded is subjected to heating for compensation of said axial compressive stresses as indicated at 10a, 10b, ... and 10g. This heating mode is laterally symmetrical relative to the central line X—X of the strip 1 or tubing 1b under shaping. The heating width w as measured laterally relative to the conveying direction of the strip, or tubing 1b, is selected to be greater, as the position progresses toward the product delivery end of the machine. In the similar way, the output or temperature ($\Delta T$) above room temperature of the heater units 10a through 10g is selected to be greater, as the position progresses toward the product delivery end of the machine for elevating enough the heating temperature successively toward said delivery end.

In the case of the present process according to the invention, since the substantial part 6 of the strip and the stock 1b are subjected to heating in all of the shaping zones BD, CL and FP, fear of the generation of buckling undulations can be precluded effectively, and indeed, throughout said shaping zones. More specifically, the first cluster roll stand CL1 included in the shaping zone is taken as an example. In the strip stock directly after having been subjected to a local and partial rounding operation at this specific roll stand CL1 and under preheated condition carried out in the foregoing upstream stage under the action of heating units 10a; 10b, the edge zones including the side edges 4; 4 of the stock have been subjected to reyielding stresses, so that the compressive stress relief aimed at is lost in effect. In case of the inventive process, however, the tubing stock is subjected at presently considering region ranged between the first cluster roll stand CL1 and the succeeding second one CL2 to the heating by the heater unit 10c to a temperature higher than that in the preceeding local region, whereby a substantial restoration of said failure of compressive stress relieving effect can be obtained by virtue of intentional introduction of the thus-appearing thermal stresses caused by the heating temperature difference. As a result, in all the inter-rollstand regions included in the strip preshaping zone beginning from the breakdown zone BD and ending at the finpass zone FP, the marginal edge zones including the strip edges 4; 4 can be held substantially in compressive stress relieved state so that the formation of buckling undulations appearing in the previously described manner can be positively prevented.

Each of heating zone width w as measured in the lateral direction relative to the strip advancing direction is selected to be successively smaller toward upstream, and, indeed, for such reason that the heat as applied to the strip stock at earlier upstream stages will diffuse laterally toward the marginal edge zones including the strip edges 4; 4 as the time goes on during the tube-shaping progress, thereby elevating the edge zone temperature. By adopting the above countermeasure, such troubles as above can be positively and effectively suppressed.

Additionally, from the view point of increasing thermal efficiency of the heat application in the foregoing sense, it is most desirable to increase the width of the heating zone width w by keeping pace with the lateral thermal diffusion rate in each interrollstand stage.

Further, in the present invention, the aforementioned temperature distribution is arranged to appear in synchronism at both lateral sides of the tubular stock relative to the center line X—X thereof when seen on a developed plane of the latter. This measure has been adopted for the prevention of offset stress distributions relative to the said center line. As an example, one side edge zone of the tubular stock is subjected to a considerable stress concentration, while, at the same time, the other side edge zone is formed disadvantageously with buckling undulations. This defective phenomenon can be, however, sufficiently overcome by the employment of the foregoing well-balanced symmetrical stress distribution as an salient feature, as is set forth above, of the present inventive process.

It should be further noted that in the upstream half of the tubing-preshaping step, the strip stock represents naturally a wider inter-edge opening than that appearing in the downstream of the preshaping step and the buckling stresses appearing in the edge zones including the longitudinal edges 4; 4 are of lower values, thus being liable to invite disadvantageous formation of buckling undulations by the presence of small stresses caused by plastic deformation. On the other hand, in the similar way, the longitudinally extending central zones of the stock represent lower buckling stresses, and if these zones should be subjected to a concentrated heating, fear of disadvantageous invitation of buckling stresses by the appearance of thermal compressive stresses may occur in these central zones in place of those which may appear in the longitudinal edge zones, as was referred to above. In the case of the present invention, however, selection of the heating temperatures adopted in the upstream half of the tube shaping step to be lower than those in the downstream half thereof, the risk of invitation of bucklings in these central zones can be avoided in an efficient and positive manner.

The edge buckling or waving is most likely to occur in the finpass zone FP. Therefore, it is imperative that the heating units be provided in this zone to provide a temperature rise above room temperature, which is from 50° to 200° C. When handling a thin strip of which the thickness is equal to or below 2.0% of the diameter of the tubing to be produced there is a possibility of waving occurring also in the zone between the breakdown roll stands BD3 and BD4. In this case, the temperature rise may be from 50° to 150° C. when the widths w of heating are small and may be kept about 50° C. for all the heating zones when the widths w of heating are large.

As the conclusion of the foregoing, it is noted that in the process for continuous manufacture of a seam-welded metal tubing, the strip stock is subjected to heat treatment at each of the divided local zones throughout the tube shaping step up to the seam-welding station, wherein the heating temperature is elevated stepwise as the tubular stock proceeds toward the welding station. In this way, the tubular stock is subjected to tensile stresses at the edge zones and in each of said divisional local zones, thereby providing a possibility of providing a best quality of seam-welded metal tubing without representing any trace of buckling markings.

Further, since the heating zone width as measured laterally relative to the strip center line extending in the stock-advancing direction, is selected to be steppingly smaller when seen in the upstream direction, occurrence of temperature rise at the marginal zones including the strip edges to be caused by lateral thermal diffusion during the conveyance of the strip or tubing in the forward and downstream direction, can be effectively prevented whereby buckling undulations of the aforementioned kind do not occur.

What is claimed is:

1. A process for continuous manufacture of a seam-welded metal tubing, comprising:
    a step for unwinding a metal strip from a strip coil;
    a preshaping step for rounding up of said metal strip into a tubular stock stepwise at successive and separated local roll stand positions;
    a seam-welding step for welding opposing and abutting longitudinal edges of said tubular stock for providing a welded seam; and
    a heating step provided in advance of said seam-welding step for heating substantial portion of said preshaped tubular stock with exception of edge zones extending along said longitudinal edges, respectively, said heating step being divided into a plurality of local zones, heating width in the divided local zones being increased stepwise toward the seam-welding step.

2. The process of claim 1 wherein the heating temperature in the divided local zones is increased stepwise toward the seam-welding step.

3. The process of claim 2 wherein the heating temperature is from 50° to 200° C. above room temperature
* * * * *